UNITED STATES PATENT OFFICE.

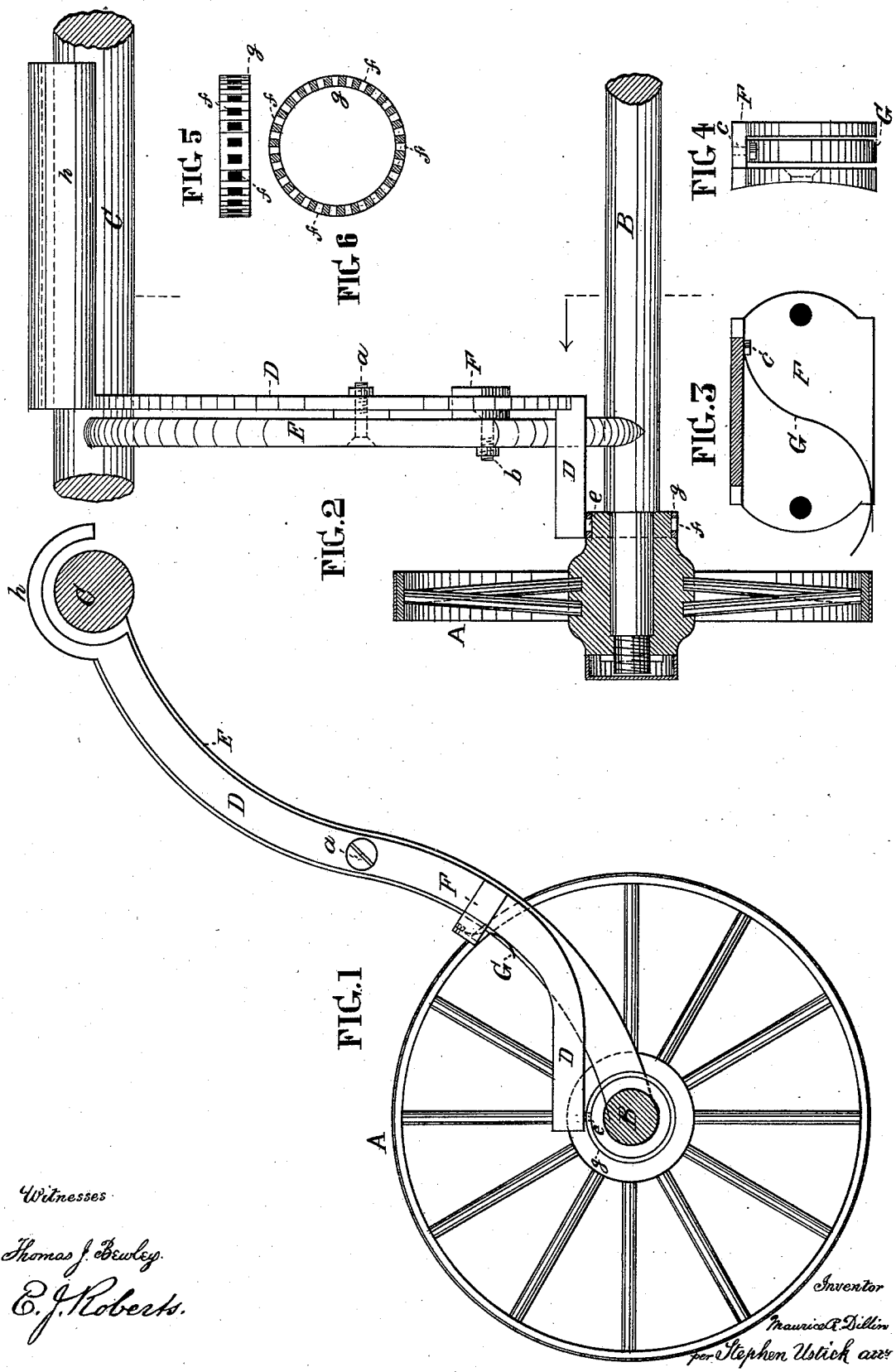

MAURICE R. DILLIN, OF PHILADELPHIA, PENNSYLVANIA.

BRAKE FOR CHILDREN'S CARRIAGES.

SPECIFICATION forming part of Letters Patent No. 308,882, dated December 9, 1884.

Application filed April 11, 1884. (No model.)

*To all whom it may concern:*

Be it known that I, MAURICE R. DILLIN, a citizen of the United States, residing at Philadelphia, in the county of Philadelphia and State of Pennsylvania, have invented a new and useful Improvement in Automatic Brakes for Children's Carriages and other Vehicles, of which the following is a specification.

The object of my invention is a cheap, simple, and efficient means of locking the wheels of a child's carriage or similar vehicle automatically as soon as the attendant removes his hand from the handle of the carriage or other vehicle; and the nature of my invention consists in the combination of a lever with one of the uprights, to which the handle is connected by means of a fulcrum-pin, the lower end of the lever being provided with a pin adapted to engage with one of a series of perforations in a band on the hub of the contiguous wheel, and the upper end having an arm so arranged as to be conveniently grasped with the hand, as hereinafter fully described. If desired, another lever of the same kind and connecting devices may be arranged with the other side of the carriage.

In the accompanying drawings, which make a part of this specification, Figure 1 is a side view of one of the wheels of a child's carriage and an upright with my improvement attached, taken at the broken line of Fig. 2, the axle B and handle C being in cross-section. Fig. 2 is a sectional rear elevation of the same through the vertical central plane of the wheel. Fig. 3 is a longitudinal section of the yoke F. Fig. 4 is an end view of the yoke and spring. Figs. 5 and 6 are respectively an edge and side view of the perforated band of the hub of the wheel.

All the views from Fig. 3 to 6, inclusive, are enlarged.

Like letters of reference in all the figures indicate the same parts.

A represents one of the wheels of a child's carriage, and B the axle. C is the handle, and D a brake-lever, connected with the handle-upright E by means of the fulcrum-pin $a$. F is a yoke confined by means of screws $b$ to the side of the upright E, as seen in Fig. 2. G is a spring, having its heel confined inside of the yoke F by means of the screw $c$, the resilient end of the spring pressing upon the lever D, and forcing the pin $e$ into one of the perforations $f$ in the band $g$ of the hub of the wheel, to lock the latter automatically, as will presently be described. The upper end of the lever D is provided with an arm, $h$, which is hollowed out on its under side, so as to partly surround the handle C, for the purpose of being conveniently grasped by the attendant while running the carriage, the lever being disengaged from the wheel by its upper end being thus pressed down; but as soon as the hand is released the spring G, by pressing the lower end down, forces the pin $e$ into one of the perforations $f$ of the band $g$. If a perforation is not in range with the pin, a very slight movement of the wheel will bring the next one in line for the pin to enter, and hence the automatic locking of the wheel will take place almost instantaneously, to prevent the movement of the carriage, as soon as the attendant removes his hand.

I have shown and described a lever only on one side of the carriage. A like one and connected devices may, if desired, be arranged also on the other side, in which a stretcher, connected at its ends with the two levers, may take the place of the arm $h$.

I claim as my invention—

1. An automatic brake for a child's carriage or other similar vehicle, consisting of a locking-lever having a pin on its lower end adapted to engage with a perforated band on the hub of one of the wheels, in combination with an upright provided with a spring for locking the wheel, substantially as described.

2. The combination of the lever D, having an arm, $h$, and pin $e$, with the upright E, having a fulcrum-pin, $a$, and yoke F, provided with the spring G, for locking the wheel A, having a hub-band, $g$, provided with perforations $f$, substantially as described.

MAURICE R. DILLIN.

Witnesses:
STEPHEN USTICK,
ALICE M. BEWLEY.